US006857698B2

(12) United States Patent
Saberan et al.

(10) Patent No.: US 6,857,698 B2
(45) Date of Patent: Feb. 22, 2005

(54) SEAT SIDE IMPACT RESISTANCE MECHANISM

(75) Inventors: Mohammad Saberan, New Baltimore, MI (US); Gerald S. Locke, Lake Orion, MI (US); Brian D. Phillips, Almont, MI (US); Jingchun Guo, Farmington Hills, MI (US); Jeff Roman, Madison Heights, MI (US); Dan Armagost, Orion Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/371,954

(22) Filed: Feb. 21, 2003

(65) Prior Publication Data

US 2004/0195873 A1 Oct. 7, 2004

(51) Int. Cl.[7] .................................................. B60N 2/42
(52) U.S. Cl. .............................. 297/216.13; 297/463.1; 297/463.2; 296/68.1; 296/187.12
(58) Field of Search ..................... 297/216.13, 216.1, 297/440.11, 463.1, 463.2; 296/68.1, 187.12

(56) References Cited

U.S. PATENT DOCUMENTS

| 4,231,607 A | 11/1980 | Bohlin |
| 4,451,078 A | 5/1984 | Maeda |
| 4,512,604 A * | 4/1985 | Maeda et al. ....... 297/216.13 X |
| 5,000,509 A | 3/1991 | Sinnhuber et al. |
| 5,219,202 A * | 6/1993 | Rink et al. ............. 297/216.13 |
| 5,290,084 A | 3/1994 | Sinnhuber |
| 5,407,244 A | 4/1995 | Nakano et al. |
| 5,584,525 A | 12/1996 | Nakano et al. |
| 5,716,094 A | 2/1998 | Bhalsod et al. |
| 5,829,827 A | 11/1998 | Schaper et al. |
| 5,918,926 A | 7/1999 | Townsend |
| 6,142,563 A | 11/2000 | Townsend et al. |
| 6,237,991 B1 | 5/2001 | Weber |
| 6,299,239 B1 | 10/2001 | Sagawa et al. |
| 6,422,631 B1 | 7/2002 | Schmidt et al. |
| 6,450,574 B1 | 9/2002 | Umezawa et al. |
| 6,595,591 B2 * | 7/2003 | Fourrey et al. ......... 297/440.11 |
| 2002/0024241 A1 | 2/2002 | Umezawa et al. |

FOREIGN PATENT DOCUMENTS

DE          195 21 888          11/1996

* cited by examiner

*Primary Examiner*—Anthony D. Barfield
(74) *Attorney, Agent, or Firm*—Bill C. Panagos

(57) ABSTRACT

A vehicle seat frame assembly that includes inboard and outboard generally vertical side members that define outer surfaces. The assembly also has a separate first spacer bracket attached to the outboard side member and has a first contact surface spaced apart from the outer surface of the outboard side member. A separate second spacer bracket is attached to the inboard side member and has a first contact surface spaced apart from the outer surface of the inboard side member. A vehicle seat assembly that includes a center console frame member and a vehicle seat. The seat has a seat frame with a pair of vertical side members and a first and second spacer bracket attached to each of the vertical side members. The first spacer bracket is positioned on an inboard side of the seat frame, with the inboard spacer bracket extending towards the center console frame member.

18 Claims, 4 Drawing Sheets

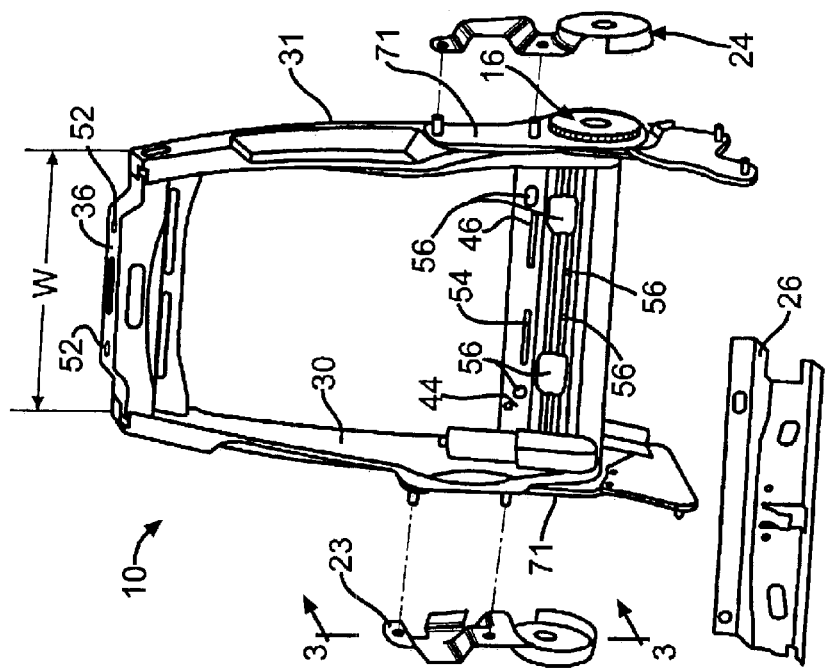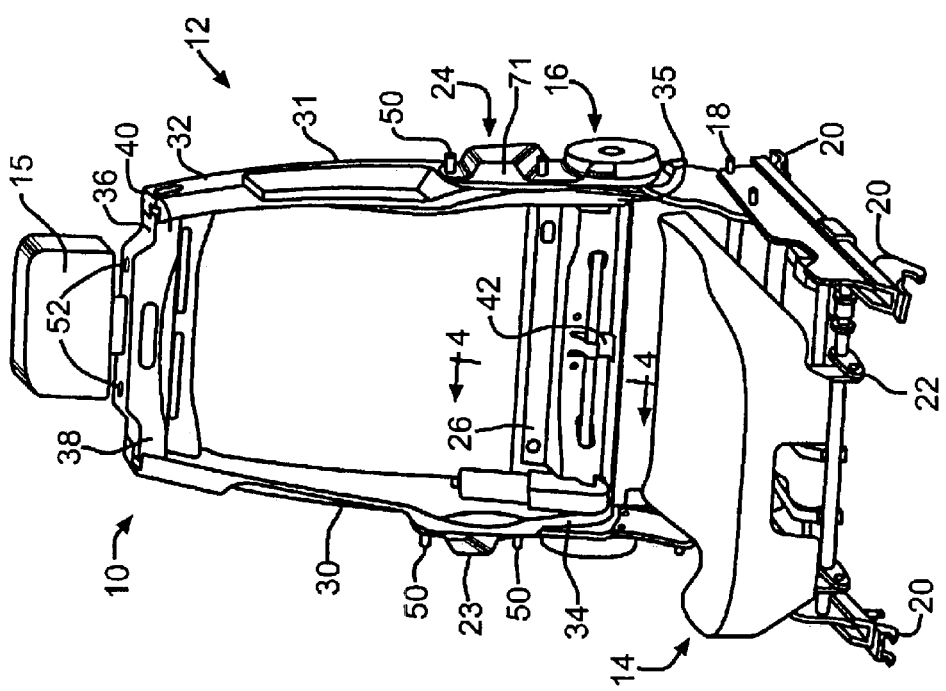

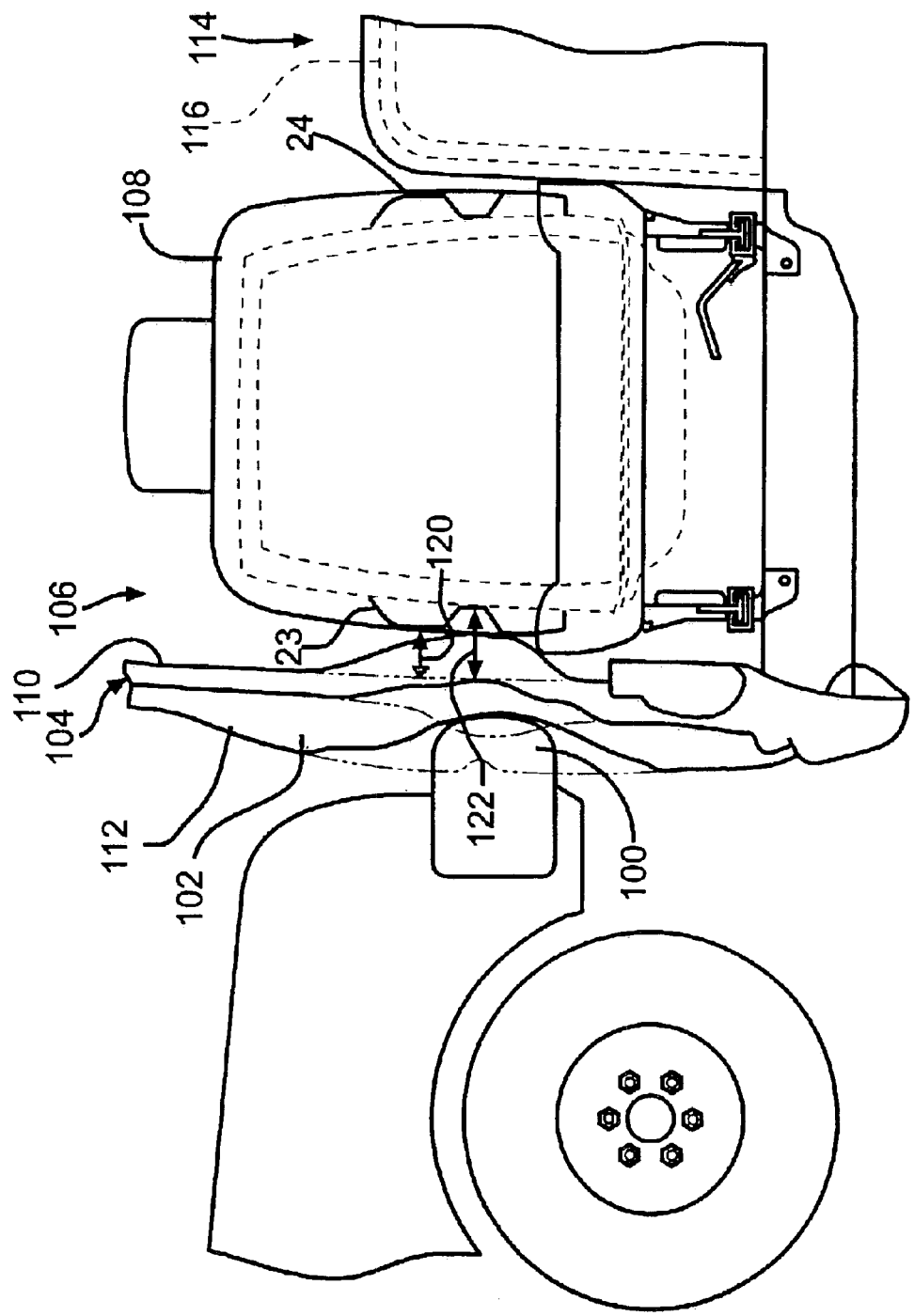

SEAT SIDE IMPACT RESISTANCE MECHANISM

BACKGROUND OF THE INVENTION

This invention relates in general to vehicle seats, and in particular to a structural support member for a vehicle seat including various vehicle components attached to the seatback and seat bottom.

In a vehicle impact condition, sudden large impact forces may be delivered to the occupant of the vehicle, such as in a rearward, frontal, or side impact. It is also common during large impact conditions for the head and limbs of the occupant to be forced against various panels and structures of the vehicle, thereby causing injury. Various countermeasures have been taken to help reduce the degree of injury during the impact conditions. For example, passive restraint systems, such as air bags or air curtains have been implemented into vehicles.

Additionally, vehicle seats for passenger vehicles have been equipped with accessories which limit the transmittal of impact forces to the seat and vehicle occupant. Vehicle seats commonly have an inverted U-shaped structural back frame having a pair of vertical side members joined together by a horizontally extending cross member positioned near the upper portion of the seat back. Often, these back frames are formed from tubular stock material which is bent to form the upper corners of the seat back.

When a vehicle is impacted from the side, for example by another vehicle, one vulnerable target is the door panel. An impact against a door panel is particularly dangerous for an occupant of the vehicle due to there being fewer protective mechanisms than exists for use during a frontal or rear impact. Additionally, during a side impact, a side panel or door panel is forced inwardly towards the passengers of the vehicle. The velocity and force of the intrusion of the door panel will vary with the speed and size of the striking vehicle. The location of the force will also vary with the size of the impacting vehicle. Nonetheless, any such intrusion could severely injure the occupants of the vehicle. Therefore, it would be advantageous to limit the intrusion of the side or door panel and transfer the force away from the occupant.

SUMMARY OF THE INVENTION

This invention relates to a vehicle seat frame assembly that has inboard and outboard generally vertical side members defining outer surfaces. The assembly also has a separate first spacer bracket attached to the outboard side member. The first spacer bracket has a first contact surface spaced apart from the outer surface of the outboard side member. The assembly includes a separate second spacer bracket attached to the inboard side member. The second spacer bracket has a first contact surface spaced apart from the outer surface of the inboard side member. The seat frame assembly can also include a cross bracket positioned between the spacer brackets.

In an alternate embodiment of the invention, a vehicle seat assembly includes a center console frame member and a vehicle seat. The seat includes a seat frame having a pair of vertical side members and a first and second spacer bracket attached to each of the vertical side members. The first spacer bracket is positioned on an inboard side of the seat frame, and the inboard spacer bracket extends towards the center console frame member.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a vehicle seat frame with spacer brackets and center bracket attached to the seat, according to the present invention.

FIG. 2 is an exploded view of a portion of the vehicle seat frame of FIG. 1 with spacer brackets and center bracket for attachment to the seat, according to the present invention.

FIG. 5 is a cutaway front view of a portion of a vehicle interior with a center console positioned adjacent to the seat and with a door panel intrusion.

DETAILED DESCRIPTION OF THE PREFERRED EMBODIMENT

Figure 3:
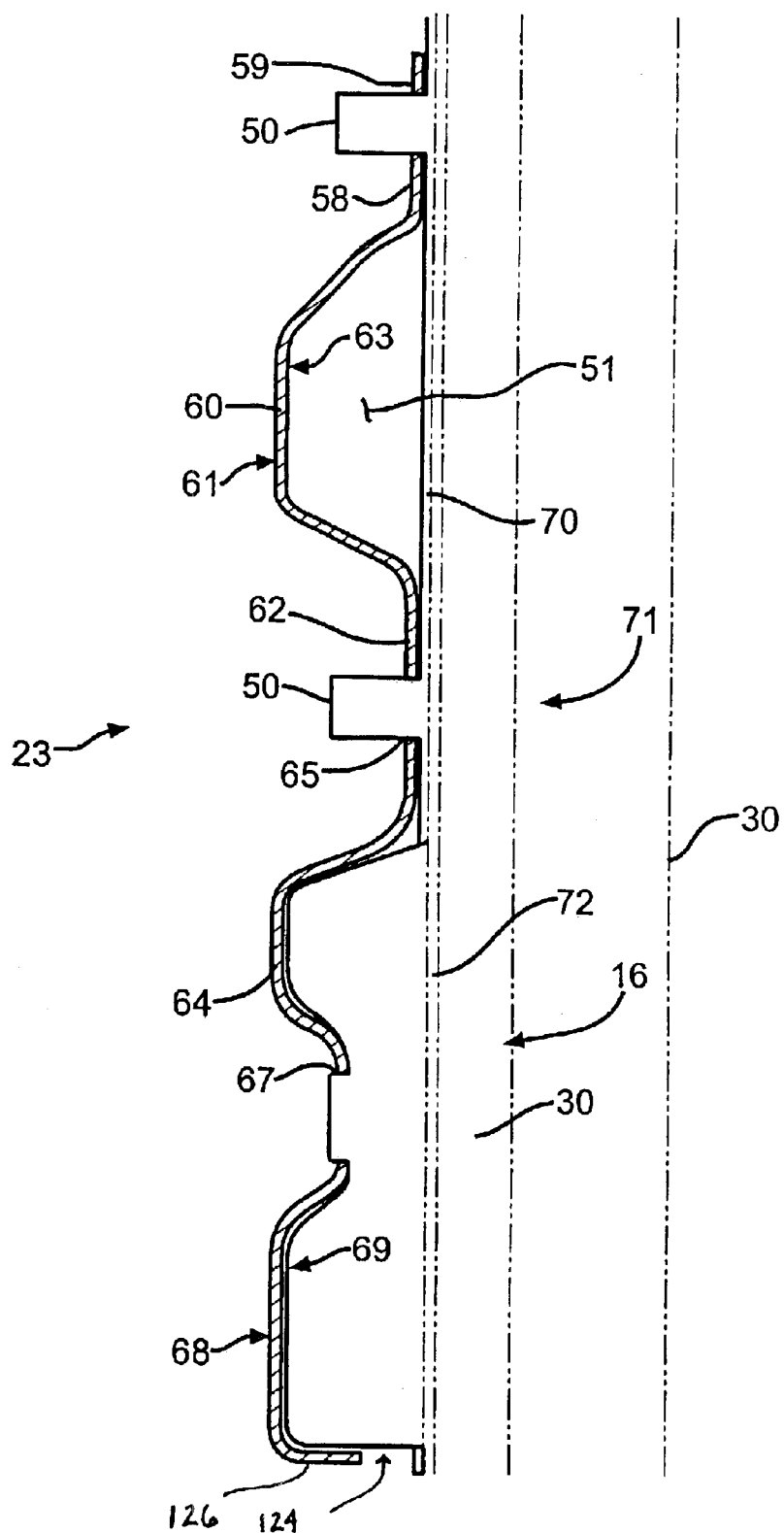
FIG. 3 is a sectional view of the spacer bracket through line 3—3.

Referring now to the drawings, there is illustrated in FIGS. 1 and 2 a vehicle seat assembly in accordance with the present invention, indicated generally at 10. The seat assembly generally includes a seat back frame, indicated generally at 12, and a seat bottom frame, indicated generally at 14. The frames 12 and 14 support cushion and trim assemblies (not shown) for supporting an occupant of the seat assembly 10. A conventional or active, movable or fixed headrest restraint 15 can be attached to the back frame 12. The back frame 12 and the bottom frame 14 are attached to one another via a recliner indicated generally at 16. The recliner 16 can be any conventional recliner mechanism, such as manually or electrically operated, which selectively permits the back frame 12 to pivot relative to the bottom frame 14. The seat assembly 10 can also include a seat adjuster 18 operatively mounted to the seat bottom frame 14. The adjuster 18 can meet any suitable seat adjuster mechanism for permitting the seat assembly 10 to move in a fore and aft direction and vertical direction relative to the vehicle floor. The adjuster 18 includes mounting structures 20 for securing the adjuster 18 to a floor or frame of a vehicle. The adjuster 18 includes two pairs of upper and lower tracks slidably disposed relative to one another. The upper tracks are mounted on the bottom frame 14 and pivotally connected to the back frame 12 by the recliner 16. The lower tracks are mounted on the vehicle floor via the mounting structures 20. The adjuster 18 can also include a lift mechanism 22 for permitting the front and rear portions of the bottom frame 14 to move in generally vertical directions relative to the adjuster 18 and floor of the vehicle independent of the back frame. Alternatively, the seat back frame 12 could be pivotally connected by the recliner 16 to the adjuster 18 (upper track) instead of the bottom frame 14 to permit the lift mechanism 22 to move the bottom frame 14 independent of the back frame 12.

Preferably, the back frame 12 and the bottom frame 14 are adapted to receive different types of head restraints 15, recliners 16, adjusters 18, and lift mechanisms 22 to form diverse seat assemblies. Thus, different seat assemblies having different characteristics, such as manual or electrical components, can be formed by using a common back frame 12 and a common bottom frame 14. The back frame 12 and the bottom frame 14 can be adapted to receive different types of components such as by including multiple locating and mounting structures, such as holes and bosses. Of course, the back frame 12 and the bottom frame 14 can be adapted to receive other components, such as occupant restraint mechanisms, air curtains, occupant detection systems, adjustable lumbar support mechanisms, and ventilation systems. The back frame 12 may also include an air bag bracket mounted on one side thereof for receiving an air bag module (not shown).

The back frame 12 includes a pair of generally vertical side members 30, 31. The side members 30 are generally elongated and have an upper end 32 and a lower end 34. The back frame 12 further includes an elongated, generally horizontally extending upper cross member 36. The upper cross member 36 includes ends 38 and 40 which are attached to the upper ends 32 of the side members 30, 31. Thus, the upper cross member 36 extends between the upper ends 32 of the side members 30, 31. A generally lower cross member 42 includes ends 44 and 46 which are attached to the lower ends 34 of the side members 30, 31. Thus, the lower cross member 42 extends between the lower ends 34, 35 of the side members 30, 31. The side members 30, 31, the upper cross member 36, and the lower cross member 42 form a generally rectangular frame having four attached corners for supporting a cushion and trim assembly (not shown) for supporting the back of an occupant. One of the side members 31 represents an inboard side member while the other side member 30 represents the outboard side member. Depending on the location of the seat 10 within a vehicle, the positions of the inboard seat member 31, and the outboard side member 30 will be reversed. For example, for a seat 10 positioned on the passenger side of a vehicle, and as viewed in FIG. 1, the inboard side member 31 will be the rightmost member and the outboard side member 30 will be the leftmost side member. However, for a driver side seat, the rightmost member will be the outboard side member. Therefore, the term inboard is used to represent the side of the seat closest to the center of the vehicle whereas the term outboard is used to represent the side closest to the exterior of the vehicle.

The side members 30, 31, the upper cross member 36, and the lower cross member 42 are preferably formed from relatively flat metallic sheets, such as aluminum or steel, which are stamped and punched. The members 30, 31, 36, and 42, forming the seatback frame 12, can have any suitable number and shapes of ridges and apertures for added strength and reduced weight. However, it can be appreciated that the seatback frame members can be formed from tubular steel members or any other suitable material. The seatback frame 12 can also include various shaped attachment mounting locations formed therein. For example, the side members 30, 31 can include apertures or pins 50 formed thereon for receiving a spacer bracket 24 mounted thereon. It is preferred that the spacer brackets 24 are located on both of the side members 30, 31. The upper cross member 36 can include apertures 52 for receiving the head restraint frame 15. The lower cross member 42 can include ridges 54 and apertures 56 for receiving the cross bracket 26 which can be mounted thereon. It is preferred that a plurality of apertures 56 be used for aligning the cross bracket 26 with the cross member 42, for attaching other seating components, and for wire routing.

The ends 38 and 40 of the upper cross member 36 are attached to the respective mating upper ends 32 of the side members 30, 31. Similarly, the ends 44 and 46 of the lower cross member 42 are attached to the respective mating lower ends 34, 35 of the side members 30, 31. Preferably, the ends of the members define mating surfaces which are overlapped with each other prior to being attached to one another. The mating surfaces of the respective ends of the members are in contact with one another, and more preferably in an overlapping manner so as to permit the ends to slide relative to one another. The sliding overlapping arrangement provides for altering the position of the ends of the members relative to one another to change the overall width W to create multiple back frames having different widths from the attachment of the same common members 30, 31, 36, and 42. Regardless of how the back frame 12 is formed, each side member 30, 31 preferably further includes at least one mounting pin on each exterior face of the side members 30, 31.

Referring now more specifically to FIG. 2, there is shown an exploded view of a portion of the vehicle seat 10 of FIG. 1. Particularly, in FIG. 2, the seat bottom frame 14 is removed, and the spacer brackets 23, 24 and cross bracket 26 are shown exploded away from the seat 10 for purposes of clarity. The first spacer bracket 23 is positioned on the outboard side of the outboard vertical side member 30. The second spacer bracket 24 is positioned on the inboard side of the inboard vertical side member 31. It is preferred that the spacer brackets 23, 24 be substantially aligned horizontally with each other, but this is not required. For example, the outboard spacer bracket 23 could be positioned at a higher location on the side member 30 to align with a door panel portion, and the inboard spacer bracket 24 could be lower, and thus, aligned with a center console of the vehicle. The cross bracket 26 is preferably positioned adjacent the lower cross member 42.

Illustrated in FIG. 3 is a sectional view of the first spacer bracket 23 through line 3—3. The side member 30 and the upper arm 70 of the recliner plate 71 (described below) are shown in FIG. 3. The spacer bracket 23 comprises an upper flange 58 that enables the bracket 23 to be attached with the side member 30. The flange 58 can include an aperture 59 therethrough such that the aperture 59 can allow a pin 50 formed on or attached to the side member 30 to pass through it. Curving away from and below the upper flange 58 is an upper plate 60. The upper plate 60 is generally flat and is horizontally spaced away from the side member 30. The outer face of the upper plate 60 defines a contact surface 61 of the spacer bracket 23. The space between the inner face 63 of the upper plate 60 and the side member 30 can define a gap 51. The gap 51 can be left unfilled as just an airspace or can be completely or partially filled with a rigid substance, such as metal, or a pliant substance, such as foam or another energy absorbing substance (not shown). Below the upper plate 60 and curved towards the side member 30 is a center flange 62. As with the upper flange 58, the center flange 62 also provides an attachment point for the spacer bracket 23. Thus, the center flange 62 can also have an aperture 65 formed through it that is adapted to receive a pin 50 that projects from the side member 30. Horizontally spaced from and below the center flange 62 is a lower plate 64. The lower plate 64 is preferably shaped and positioned so as to cover the recliner mechanism 16 of the seat. The outer face of the lower plate 64 defines a second contact surface 68 of the spacer bracket 23. The inner face 69 of the lower plate 64 preferably is adjacent to the recliner mechanism 16 and can be used as an additional attachment point for the spacer bracket 23. A lower flange 126 is positioned below the lower plate 64. The lower flange 126 preferably partially extends towards the side member 30. The space from the end of the lower flange 126 to the side member 30 defines a gap 124. The gap 124 is preferably adapted to receive a portion of the recliner mechanism 16, or other moving components of the seat 10 so that the moving components do not interfere with or rub against the spacer bracket 23. It should be considered that the lower flange 126 below the contact surface 68 (of plate 64) can also become a load bearing surface should the gap 124 become closed. The lower flange 126 preferably can support the lower plate 64 if the inner face 69 does not first contact the recliner mechanism 16 during or after an impact. It is preferred that the contact surface 61 of the upper plate 60 and the contact surface 68 of the lower plate 64 are substantially in the same generally vertical plane. The second spacer bracket 24 has a similar configuration to the first spacer bracket 23, however it should be understood that the contact surfaces will extend away from the side member 31 in the opposite direction of the contact surfaces 61, 68 of the first spacer bracket 23. Similarly, the flanges of the second spacer bracket will extend towards the side member 31 in the opposite direction of the flanges of the first spacer bracket 23.

Also shown in FIG. 3 is a portion of the recliner mechanism 16 comprising the recliner plate 71. The recliner plate 71 has an upper arm 70 and a lower arm 72 and is positioned between a side member and the spacer bracket. The recliner plate 71 can be affixed to the side member by any conventional means, such as welding. The lower arm 72 of the recliner plate 71 is preferably rigidly fixed to the side member 30 and pivotally attached to the seat bottom assembly. Once the recliner plate 71 is affixed to the side member 30, the spacer bracket 23 can be attached to the upper arm 70 about the connection pins 50. The connection pins 50 are preferably integrally formed with the upper arm of the recliner plate and the spacer bracket 23 is attached to the upper arm 70 about the pins 50 that project through the apertures 59, 65 through the flanges 58, 62 of the spacer bracket 23. It should be understood, however, that the use of pins 50 is not essential and the spacer bracket 23 can be attached to the upper arm 70 of the recliner plate 71 by welding, bolting, riveting, using threaded fasteners, or by any other suitable means for attaching the bracket to the recliner plate 71. Additionally, in a preferred embodiment, the pins 50 are threaded studs and thus, nuts can be threaded thereupon to secure the recliner plate 71 and spacer bracket 23, 24 therewith. Alternatively, it should be understood that the spacer bracket 23 could be attached directly to the side member 30 without the use of the recliner plate 71. In that case, the pins 50 could be formed directly on the side member 30. In an alternate embodiment, pins 50 are formed on the side panel 30 and the recliner plate 71 is formed having a plurality of apertures formed therethrough so that the recliner plate can be aligned and attached with the side member upon the side member pins 50. The spacer bracket 23 can then be attached over the recliner plate 71. However, in a preferred embodiment, the recliner plate 71 is integrated with the recliner mechanism 16 of the seat 10 and therefore would be attached with the side member 30.

It is preferred that the spacer brackets be sized and located such that the intrusion of a pillar or door caused by a striking object (vehicle, test barrier, pole, etc.) can contact at least one of the upper and lower contact surfaces 61 and 68 of the bracket 23 during an impact. Due to the relatively large vertical height and differing positions of vehicle bumpers 100 relative to the contact surfaces 61, 68 of the spacer bracket 23, it is preferred that there be at least two contact surfaces 61, 68 with an inwardly spaced center flange portion located between the contact surfaces 61, 68. By dividing the contact surfaces and providing additional support therebetween, an extra level of structural rigidity is created. This helps prevent the center of a single, long, continuous contact surface from deforming relatively easily during an impact. It is also preferred that the spacer brackets be sized or located such that the spacer brackets will be in a position to take an impact force regardless of the arrangement of the seat due to reclining or vertical adjustment. Because the spacer brackets 23, 24 are attached to the seat 10, the brackets assist with transferring impact forces regardless of the fore or aft position of the seat 10.

Figure 4:
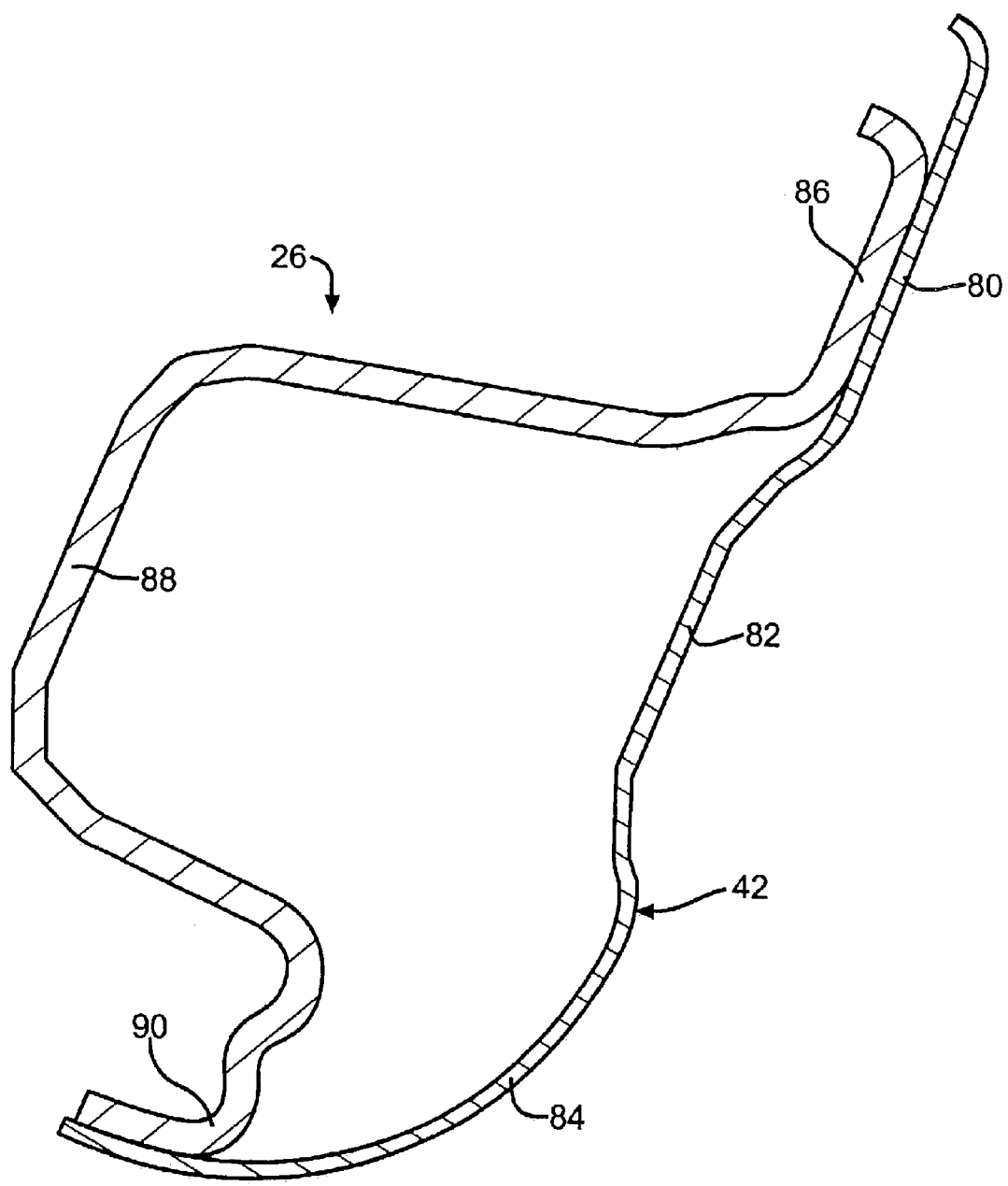
FIG. 4 is a sectional view of the center bracket through line 4—4.

Referring now to FIG. 4, there is illustrated a cross-sectional view of the cross bracket 26 through line 4—4. The cross bracket 26 is adapted to fit over the lower cross member 42 (commonly known in the art as a J-Panel). The J-Panel provides lateral strength and stability to the seat 10. The cross bracket 26 can be attached to the lower cross member 42 by welding, the use of fasteners, or any other conventional attachment means. Additionally, the cross bracket 26 can directly engage, or be spaced away from the cross member 42. The lower cross member 42 is a generally thin, curved piece of metal stamping that is positioned between the lower ends 34, 35 of the side members 30, 31 for structural support. The upper portion 80 of the cross member 42 is generally flat with optional grooves and apertures formed thereon. The center portion 82 extends downward from the upper portion 80 and is U-shaped. The curve of the "U" extends in a direction towards the front of the seat 10. This creates a spaced relationship between the cross bracket 26 and the cross member 42. Although such a spaced relationship is illustrated, it should be understood that any spacing can be used between the cross bracket 26 and cross member 42. Additionally, the space can be non-uniform along the respective lengths of the cross bracket 26 and cross member 42. The lower portion 84 extends below the center portion 82 and is also generally thin. However, the lower portion 84 is more greatly curved and extends in a direction from the rear of the seat 10 to the front of the seat 10. It should be understood that the cross member 42 can have any suitable shape so as to provide support between the side members 30, 31. Additionally, the cross member 42 can have any number of perforations formed therein in order to reduce the weight of the piece.

It should be understood that the use of the cross member 42 without the cross bracket 26 may be sufficient for providing structural rigidity to the seat back frame 12. The cross bracket 26 is an optional structure which may be included to increase the strength of the seatback frame 12, as discussed below. The optional cross bracket 26 preferably has a length and shape that generally conforms to the shape of the lower cross member 42. Particularly, the cross bracket 26 has an upper flange 86 that extends generally the same length of the bracket 26. It should be understood that the cross bracket 26 could have any length. The upper flange 86 may also have any number of apertures formed thereon that align with apertures on the cross member 42 so that the bracket 26 and cross member 42 can be attached together or accept other seat components. Extending towards the front of the seat 10 is a generally U-shaped center portion 88 of the bracket 26. The center portion 88 can extend towards the front of the seat 10 an identical or greater distance than the center portion 82 of the lower cross member 42. If the center portion 88 of the bracket 26 extends further than the center portion 82 of the cross member 42, then the space between the inner surface of the cross bracket 26 and the outer surface of the cross member 42 defines a gap. The gap could be an open space, or could be filled with a rigid material, or a foam or other energy absorbing material (not shown). The lower flange portion 90 of the cross bracket 26 extends back towards the lower cross member 42 and preferably mates with the lower portion 84 of the cross member 42. It is preferred that the cross bracket 26 have a thickness that is greater than that of the lower cross member 42. However, the thickness of the cross bracket 26 could be the same or less than the thickness of the lower cross member 42. Additionally, the cross bracket 26 could be made of a material that is different than the material of the lower cross bracket 42. It should also be understood that the cross bracket 26 could be positioned at any vertical location between the side members 30, 31. Particularly, the cross bracket 26 could be located at a point that is aligned with one or both of the contact surfaces 61 and 64 of the inboard and outboard spacer brackets 23, 24.

With respect to FIG. 5, the application and use of the spacer brackets 23, 24 and cross bracket 26 is illustrated. During a side impact, such as might occur with an striking vehicle contacting the door panel 102 (or other side panel of the vehicle) of the struck vehicle 104, the bumper 100 of the striking vehicle forces a portion of the door panel 102 into the passenger compartment 106 of the struck vehicle 104. It is understood that the door panel 102 also schematically represents any side portion of a vehicle such as a door, vertical pillar, window, or any other side component. Illustrated in FIG. 5 is a vehicle interior 106 including a vehicle seat 10. The seat 10 is substantially similar to the seat described above with respect to FIG. 1. However, it should be understood that any seat can be used in accordance with the present invention. To make the seat 10 comfortable, frame members of a vehicle seat 10 are typically covered with a foam cushion material 108, which extends outwardly from the frame members. The foam cushion 108 is then covered with a cloth, leather or other trim material for durability and aesthetic purposes. Additionally, the trim material can be used to hide the inner structure of the seat 10, including the spacer brackets 23, 24 and cross bracket 26. Adjacent the seat 10 is the interior portion 110 of the door panel 102. There can also be a side pillar, commonly referred to as a "B" pillar adjacent the vehicle seat 10. Positioned on the outer portion of the door panel 102 or pillar is the outer shell 112 of the struck vehicle 104. Typically the outer shell 112 is made of sheets of steel and plastic moldings.

When an striking vehicle causes a side-impact collision with a struck vehicle 104, i.e. where a vehicle bumper 100 of the striking vehicle contacts the outer shell 112 of the struck vehicle 104, the outer shell 112, and thus the door panel 102, are forced in towards the vehicle seat 10, as illustrated in FIG. 5. The point of contact of the striking portion can vary depending on the height of the bumper 100 of the striking vehicle. As described in the Background, it is advantageous for a vehicle seat to begin absorbing and transferring the impact load as soon as possible to minimize the force applied to the occupant of the seat. As illustrated in FIG. 5, a gap 122 depicts the distance the interior portion 100 of an intruding door panel 102 would travel before making contact with the seat 10 when the door panel 102 is struck. By implementing the spacer bracket 23 of the present invention, the space between the door panel 102 and the seat 10 is reduced, as indicated by the arrow depicting the gap 120.

Due to an increasing number of vehicles having a higher bumper level, e.g. sport utility vehicles and minivans, a door intrusion during a collision could occur at a point that is higher up the seatback. A side collision with a vehicle having a lower bumper typically allows a door panel or pillar intrusion to contact a vehicle seat 10 at a lower point, generally near the junction of the seatback frame 12 and seat bottom frame 14. The impact force would be transferred more easily at that junction point since vehicle seats have more structural support at that location. Therefore, the vehicle seat 10 of the present invention is better adapted to assist in force transfer with the application of a force at a higher position due to the additional structural members in accordance with the present invention.

Illustrated in FIG. 5 is a portion of the striking vehicle bumper 100 forcing the vehicle outer shell 112 and interior door panel 110 inwards towards the vehicle seat 10 (the original position of the outer shell 112 and interior portion 110 of the door panel 102 are represented by phantom lines). As the door panel 102 strikes or intrudes into the passenger compartment 106, the panel 102 contacts the outboard spacer bracket 23. Due to the spacer bracket 23 extending in a direction towards the door panel 102, the panel 102 contacts the seat 10, and spacer bracket 23, sooner than a door panel 102 would contact a seat structure without the spacer bracket. This earlier contact allows the force to be transmitted to the seatback frame 12 earlier, and therefore reduces the length of intrusion of the door panel 102 into the interior 106. The force is then transmitted sooner to the cross member 42 and cross bracket 26 of the seat 10. Additionally, the force can be transmitted through the seat bottom frame 14 and to the vehicle floor. By transmitting the forces through the various components of the seat 10, less force is required to be absorbed by an occupant of the seat, thereby reducing the potential for injuries to the seat occupant. Additionally, the outboard spacer bracket 23 also limits the distance which the door panel 102 enters the passenger compartment 106 thereby reducing the potential of occupant injury.

Also illustrated in FIG. 5 is a center console 114. A center console 114 can be used to provide an armrest for seat occupants and can also provide storage space for items such as sunglasses, CDs, money, or cup holders. A center console 114 is typically a rectangular plastic box with an outer covering of cloth or leather that corresponds to the vehicle interior. A center console 114 is typically hollow and has a replaceable lid that allows a user to access the hollow interior for storage of personal items. The console 114 is usually supported by a rigid frame member schematically indicated at 116. As described above, an striking vehicle impacting the seat 10 causes a large magnitude of force to be transmitted to the seat. As the force is transmitted through the outboard spacer bracket 23 to the seat frame 12, the inboard spacer bracket 24 can also be implemented to absorb and transmit the impact force to the frame member 116 of the center console 114. This allows an even greater amount of force to be transmitted from, and thus not absorbed by, the seat 10. Alternatively, a spacer bracket could be attached to the center console 114 to provide another force transferring surface.

An advantage of the separate spacer brackets and cross bracket of the present invention is that a seatback frame member 12 including the spacer brackets and cross bracket can be manufactured as a more rigid seatback frame 12 by simply modifying an existing seatback frame 12 having only the side members 30, 31, the upper cross member 36, and the lower cross member 42.

It should be understood that the spacer brackets and cross bracket can be adapted to be attached to any seat frame member. Accordingly, the size, shape, material, location and method of attachment described above should not be viewed as limiting the manner in which this invention can be practiced. In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat frame assembly for mounting in a vehicle between an exterior panel and a center console mounted in a vehicle the seat frame member comprising:
    generally vertical inboard and outboard side members defining outer surfaces;
    a separate first spacer bracket attached to said outboard side member, said first spacer bracket having a first contact surface spaced apart from said outer surface of said outboard side member; and
    a separate second spacer bracket attached to said inboard side member, said second spacer bracket having a first contact surface spaced apart from said outer surface of said inboard side member wherein the first and second spacer brackets cooperate to widen the width of the seat frame to help minimize the intrusion of an exterior panel upon a side impact of the vehicle;
    wherein each spacer bracket includes:
        an upper flange;
        an upper plate positioned below and outwardly spaced from said upper flange;
        a center flange positioned below and inwardly spaced from said upper plate; and
        a lower plate positioned below and outwardly spaced from said center flange.

2. The seat frame assembly defined in claim 1 further comprising a lower flange positioned below and inwardly spaced from the lower plate.

3. The seat frame assembly defined in claim 2 wherein an end of the lower flange remains spaced away from the generally vertical side member.

4. The seat frame assembly defined in claim 1 wherein one of the upper plate and the lower plate defines the first contact surface.

5. The seat frame assembly defined in claim 1 wherein the upper flange and center flange are positioned adjacent to the side member.

6. The seat frame assembly defined in claim 1 wherein the upper plate and lower plate are substantially in the same generally vertical plane.

7. The seat frame assembly defined in claim 6 wherein the lower plate is positioned adjacent to a seat recliner.

8. The seat frame assembly defined in claim 5 wherein the lower plate defines a second contact surface.

9. The seat frame assembly defined in claim 1 further comprising a cross bracket positioned between the first and second spacer brackets.

10. The seat frame assembly defined in claim 9 wherein the seat frame assembly includes a lower cross member extending between the side members, and wherein the cross bracket is a separate component attached to the lower cross member.

11. The seat frame assembly defined in claim 10 wherein a portion of the cross bracket is spaced away from the lower cross member.

12. The seat frame assembly defined in claim 1 further comprising a cross bracket positioned between the first and second spacer brackets.

13. An assembly comprising:
    a center console frame member; and
    a vehicle seat including;
        a seat frame having a pair of vertical side members; and
        a first and second spacer bracket attached to each of the vertical side members;
        wherein the first spacer bracket is positioned on an inboard side of the seat frame, said inboard spacer bracket extends towards the center console frame
    wherein each spacer bracket includes:
        an upper flange;
        an upper plate positioned below and outwardly spaced from said upper flange;
        a center flange positioned below and inwardly spaced from said upper plate; and
        a lower plate positioned below and outwardly spaced from said center flange.

14. The assembly defined in claim 13 further comprising a lower flange positioned below and inwardly spaced from said lower plate.

15. The assembly defined in claim 13 wherein the upper plate and the lower plate are substantially in the same generally vertical plane.

16. The assembly defined in claim 15 wherein the upper plate is spaced away from the side member.

17. The assembly defined in claim 13 further comprising a cross bracket positioned between the first and second spacer brackets.

18. The assembly defined in claim 13 further comprising a cross bracket positioned between the side members at a position adjacent the lower plates of the spacer brackets.

* * * * *